(12) United States Patent
Bathelier et al.

(10) Patent No.: US 11,358,542 B2
(45) Date of Patent: Jun. 14, 2022

(54) AUTOMOTIVE VEHICLE SOUND PROOFING PART AND RELATED PROCESS

(71) Applicant: FAURECIA AUTOMOTIVE INDUSTRIE, Nanterre (FR)

(72) Inventors: Xavier Bathelier, Saint Pierremont (FR); Anne-Sophie Debruyne, Charleville-Mezieres (FR); Minh-Tan Hoang, Sedan (FR)

(73) Assignee: FAURECIA AUTOMOTIVE INDUSTRIE, Nanterre (FR)

( * ) Notice: Subject to any disclaimer, the term of this patent is extended or adjusted under 35 U.S.C. 154(b) by 568 days.

(21) Appl. No.: 16/280,763

(22) Filed: Feb. 20, 2019

(65) Prior Publication Data

US 2019/0256014 A1     Aug. 22, 2019

(30) Foreign Application Priority Data

Feb. 22, 2018    (FR) ..................................... 18 51552

(51) Int. Cl.
    *B60R 13/08*        (2006.01)
    *B32B 27/12*        (2006.01)

(52) U.S. Cl.
    CPC .......... *B60R 13/0838* (2013.01); *B32B 27/12* (2013.01); *B60R 13/08* (2013.01); *B60R 13/0815* (2013.01); *B32B 2307/102* (2013.01); *B32B 2605/08* (2013.01)

(58) Field of Classification Search
    CPC . B60R 13/0838; B60R 13/08; B60R 13/0815; B32B 27/12; B32B 2307/102; B32B 2605/08

USPC ......................................................... 181/290
See application file for complete search history.

(56) References Cited

U.S. PATENT DOCUMENTS

| | | | | | |
|---|---|---|---|---|---|
| 3,979,487 | A | * | 9/1976 | Squier | ..................... B44F 11/00 264/419 |
| 4,966,799 | A | * | 10/1990 | Lucca | ..................... B60N 3/048 428/95 |
| 5,064,714 | A | * | 11/1991 | Yamaguchi | ............. B60R 13/08 428/219 |

(Continued)

FOREIGN PATENT DOCUMENTS

| CN | 1842698 A | 10/2006 |
|---|---|---|
| CN | 101484335 A | 7/2009 |

(Continued)

OTHER PUBLICATIONS

French Search Report corresponding to FR application No. 1851552, 3 pages.

(Continued)

*Primary Examiner* — Forrest M Phillips
(74) *Attorney, Agent, or Firm* — Reising Ethington P.C.

(57) ABSTRACT

An automotive vehicle soundproofing part having a body that includes a plurality of interlaced and/or bonded fibers. The body includes, in its thickness: a porous upper region of granular elements dispersed between the fibers; and a porous lower region with no dispersed granular elements, or formed of a concentration of dispersed granular elements lower than the concentration in dispersed granular elements of the porous upper region. The porous upper region has an air passage resistance at least 100 $N \cdot m^{-3} \cdot s$ greater than the air passage resistance of the porous lower region.

19 Claims, 1 Drawing Sheet

(56) References Cited

U.S. PATENT DOCUMENTS

| | | | | |
|---|---|---|---|---|
| 2004/0185239 | A1* | 9/2004 | Nakamura | B32B 5/26 |
| | | | | 428/292.4 |
| 2006/0113146 | A1 | 6/2006 | Khan et al. | |
| 2006/0234019 | A1 | 10/2006 | Pohlmann | |
| 2007/0066176 | A1* | 3/2007 | Wenstrup | D04H 1/732 |
| | | | | 442/415 |
| 2011/0031064 | A1* | 2/2011 | Law | B32B 5/245 |
| | | | | 181/294 |
| 2014/0070562 | A1* | 3/2014 | Inagaki | B32B 27/12 |
| | | | | 296/180.1 |
| 2016/0059799 | A1* | 3/2016 | Kim | B32B 27/32 |
| | | | | 296/39.3 |
| 2016/0297174 | A1* | 10/2016 | Kim | B32B 5/022 |
| 2018/0236746 | A1* | 8/2018 | Lee | C08J 5/12 |

FOREIGN PATENT DOCUMENTS

| | | |
|---|---|---|
| CN | 102892631 A | 1/2013 |
| CN | 103415416 A | 11/2013 |
| CN | 105848875 A | 8/2016 |
| CN | 107667008 A | 2/2018 |
| DE | 20100632 U1 | 2/2002 |
| DE | 102006005369 B3 | 7/2007 |
| EP | 1657375 A1 | 5/2006 |
| EP | 2053593 A2 | 4/2009 |
| FR | 2889617 A1 | 2/2007 |
| JP | H11044014 A | 2/1999 |
| JP | 2004131894 A | 4/2004 |
| JP | 2017082229 A * | 5/2017 |
| WO | 2018002457 A1 | 1/2018 |

OTHER PUBLICATIONS

Arnaud Duval, et al., "Generalized Light-Weight Concept: a comprehensive acoustic package weight reduction strategy," Automobile Comfort Conference, Nov. 15, 2006, pp. 1-8, Le Mans, France.

* cited by examiner

AUTOMOTIVE VEHICLE SOUND PROOFING PART AND RELATED PROCESS

CROSS-REFERENCE TO RELATED APPLICATIONS

This application is a U.S. non-provisional application claiming the benefit of French Application No. 18 51552, filed on Feb. 22, 2018, which is incorporated herein by reference in its entirety.

FIELD OF THE INVENTION

The present invention relates to an automotive vehicle soundproofing part, comprising a body comprising a plurality of interlaced and/or bonded fibers.

BACKGROUND

Such a part is intended to resolve the acoustic problems that arise in a substantially closed space, such as the passenger compartment of an automotive vehicle (mat, roof, door panel, etc.), near noise sources such as an engine (fire wall, etc.), or the tire contact with a road (wheel passage, etc.).

In general, in the low-frequency domain, the acoustic waves created by the aforementioned noise sources undergo a "damping" by materials in the form of single or double sheets (pre-stressed sandwich) having a viscoelastic behavior or by acoustic attenuation of a porous and resilient mass-spring system.

Within the context of the present invention, a soundproofing part provides "insulation" when it impedes or prevents the entry of medium- and high-frequency acoustic waves into the soundproofed space, essentially by reflecting waves toward the noise sources or the outside of the soundproofed space.

A soundproofing part operates by "sound absorption" (in the medium- and high-frequency field) when the energy from the acoustic waves dissipates in an absorptive material.

A high-performance soundproofing part must work both by providing good insulation and absorption. To characterize the performance of such an assembly, the notion of noise reduction (NR) index is used, which takes into account the notions of insulation and absorption: this index can because related using the following equation:

$$NR(dB)=TL-10 \log(S/A),$$

where TL is the sound transmission loss index (hereinafter referred to as the loss index) reflecting the insulation. The higher this index is, the better the insulation is.

A is the equivalent absorption surface. The higher A is, the better the absorption is. S is the surface area of the part.

It is known to use soundproofing assemblies of the mass-spring type made up of a porous and resilient base layer, on which an impermeable layer with a heavy mass is arranged. This impermeable heavy mass layer generally has a high surface density, in particular greater than 1 kg/m², and a mass density that is also high of around 1500 kg/m³ to 2000 kg/m³.

Such acoustic assemblies provide good acoustic insulation, but are relatively heavy. Furthermore, their behavior does not perform very well in terms of absorption.

To decrease the mass of a soundproofing assembly, and to obtain an improved absorption behavior, US2006/0113146 describes an acoustic assembly of the "bipermeable" type.

Such an assembly does not have a heavy mass. The heavy mass is replaced by a porous upper layer with a much greater resistance to the passage of air than the lower layer on which it bears. This layer is oriented toward the arrival of the sound in the automotive vehicle.

To manufacture such an assembly, it is known to use a same base textile web. The textile web is cut into two parts, which undergo different compressions.

The most compressed part makes up the porous layer of greater resistivity. It is assembled by gluing on the less compressed part.

The process for manufacturing such a part is therefore relatively complex, since it requires several steps, which increases the manufacturing cost of the part.

SUMMARY

One aim of the invention is to obtain a soundproofing part that is very effective in terms of absorption, and that is nevertheless easy and inexpensive to produce.

To that end, the invention relates to a part of the aforementioned type, wherein the body comprises, in its thickness:

- a porous upper region comprising granular elements dispersed between the fibers;
- a porous lower region with no dispersed granular elements, or comprising a concentration of dispersed granular elements lower than the concentration in dispersed granular elements of the porous upper region;
- the porous upper region having an air passage resistance at least 100 $N \cdot m^{-3} \cdot s$ greater than the air passage resistance of the porous lower region.

The part may include one or more of the following features, considered alone or according to any technically possible combination(s):

- the air passage resistance of the porous upper region is greater than 250 $N \cdot m^{-3} \cdot s$ and is in particular comprised between 250 $N \cdot m^{-3} \cdot s$ and 1500 $N \cdot m^{-3} \cdot s$;
- it comprises bonding elements, the granular elements being bonded to the fibers via the bonding elements;
- the average size of the granular elements is less than 1 mm and is in particular between 5 μm and 500 μm;
- the density of the material making up the granular elements is less than 3, and is in particular between 0.8 and 2;
- the thickness of the porous upper region is less than 50% of the thickness of the body;
- the body is a felt or a textile;
- the body is in one piece;
- the granular elements are made from baryte, chalk or clay fillers.

The invention also relates to a process for manufacturing a soundproofing part for an automotive vehicle, comprising the following steps:

- providing a body comprising a plurality of interlaced and/or bonded fibers;
- incorporating granular elements between the fibers of a porous upper region of the body;
- maintaining a porous lower region with no dispersed granular elements, or a porous lower region having a concentration of dispersed granular elements lower than the concentration in dispersed granular elements of the porous upper region;
- the porous upper region having an air passage resistance at least 100 $N \cdot m^{-3} \cdot s$ greater than the air passage resistance of the porous lower region.

The process may include one or more of the following features, considered alone or according to any technically possible combination(s):
- the air passage resistance of the porous upper region is greater than 250 N·m$^{-3}$·s and is in particular comprised between 250 N·m$^{-3}$·s and 1000 N·m$^{-3}$·s;
- it comprises a step for incorporating, between the fibers of the porous upper region of the body, bonding elements, and activating the bonding elements, advantageously by heating to bond the granular elements to the fibers;
- the control of the penetration thickness of the granular elements during the incorporating step so that the thickness of the porous upper region is less than 50% of the thickness of the fibrous body;
- the step for incorporating the granular elements comprises incorporating granular elements into the body by applying an electric field and/or by applying a vibrational movement to the body.

BRIEF DESCRIPTION OF THE DRAWINGS

The invention will be better understood upon reading the following description, provided solely as an example and done in reference to the appended drawings, in which.

DETAILED DESCRIPTION

In the rest of this document, the orientations are generally the typical orientations of a motor vehicle. However, the terms "above", "on", "below", "under", "upper" and "lower" are to be understood as relative terms, with respect to the reference surface of the automotive vehicle, in light of which the soundproofing assembly is arranged. The term "lower" is thus understood as being situated as close as possible to the surface, and the term "upper" as being situated as far as possible from this surface.

Figure 1:
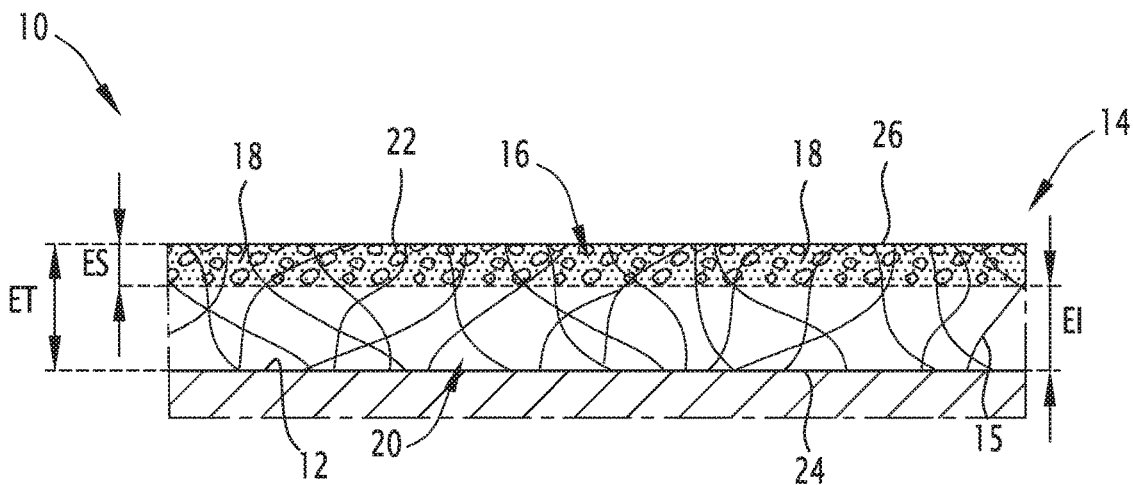
FIG. 1 is a schematic sectional view of a first soundproofing part according to an embodiment of the invention.

A first soundproofing part 10 according to an embodiment of the invention is shown in FIG. 1. This part 10 is intended to be arranged across from a surface 12 of an automotive vehicle.

The surface 12 is for example a sheet metal surface of the vehicle in particular defining a floor, ceiling, door, fire wall separating the passenger compartment from the engine compartment, hood, or wheel well of the automotive vehicle.

The part 10 is intended to be applied directly on the surface 12. It may be attached on the surface 12, advantageously using pins (for example in the case of a fire wall) or placed thereon (for example in the case of a mat). In one alternative, the part 10 is glued on the surface 12.

The part 10 comprises a single-piece body 14, formed by a plurality of interlaced and/or bonded fibers 15, the body 14 comprising a porous upper region 16 comprising granular elements 18 dispersed between the fibers 15 and a porous lower region 20 provided without dispersed granular elements 18 or comprising a concentration of dispersed granular elements 18 lower than the concentration of dispersed granular elements 18 in the porous upper region 16.

Advantageously, the upper region 16 of the part 10 further comprises bonding elements 22 to bond granular elements 18 to the fibers 15.

In this example, the body 14 is formed by a felt or a single-piece textile.

"Single-piece" means that the body 14 is formed by a single layer of interlaced and/or bonded fibers, and not an assembly of layers bonded to one another.

As used herein, "felt" refers to a mixture of base fibers and binder. The base fibers can be noble and/or recycled fibers, natural or synthetic, of one or several types. Examples of natural fibers that can be used are linen, cotton, hemp, bamboo, etc. Examples of synthetic fibers that can be used are inorganic fibers such as glass fibers, or organic fibers such as Kevlar, polyamide, acrylic, polyester, polypropylene.

The binder is preferably a thermosetting resin. Examples of thermosetting resins are epoxy resins or phenolic resins or polyester resins.

In one alternative, the felt comprises a higher percentage of microfibers, for example more than 50%, and advantageously 80% microfibers.

"Microfibers" refer to fibers with a size smaller than 0.9 dtex, advantageously 0.7 dtex.

In one alternative, the felt contains recycled material, for example coming from waste of internal or external origin, in particular scraps from automotive equipment parts, manufacturing rejects, or end-of-life vehicle parts. This waste is for example ground and incorporated into the felt in the form of divided pieces of material made up of agglomerates, flakes or particles. The components of the waste can be separated before or during grinding.

A textile refers to a web of fibers essentially with a thermoplastic polymer base such as polypropylene, polyesters or polyamides, assembled mechanically by needlepunching without using chemical binders. Such a web may contain a percentage of thermoplastic or natural recycled fibers.

In reference to FIG. 1, the body 14 has a lower surface 24 intended to be oriented toward the surface 12, preferably intended to be pressed on the surface 12, and an upper surface 26 intended to be oriented away from the surface 12.

The body 14 has a total thickness ET, taken perpendicular to the surface 12 between the lower surface 24 and the upper surface 26, greater than 1 mm and in particular between 5 mm and 40 mm.

The granular elements 18 are for example fillers in powder form. The fillers are for example baryte, chalk or clays.

The granular elements 18 have an average size calculated as a number-average of less than 1 mm and in particular between 5 μm and 500 μm.

This average size is for example measured according to standard ISO13320-1.

The density of the material making up the granular elements 18 is less than 5, and is in particular between 0.8 and 2.

The bonding elements 22 are for example formed by a fusible material powder at a temperature below 160° C., for example a polymer powder such as a polyolefin or polyethylene powder.

In the part 10, the fusible material powder has been melted at least partially to bond the fibers 15 to the granular elements 18, without melting the granular elements 18.

Thus, the granular elements 18 are kept in position relative to the fibers 15 by the bonding elements 22.

As indicated above, the concentration of granular elements 18 in the porous upper region 16 is at least 10% higher than the concentration of granular elements 18 in the lower region 20.

The presence of the granular elements 18 in the porous upper region 16 plugs the interstices present between the fibers 15, which increases the tortuosity and decreases the porosity of the porous upper region 16, while keeping a non-nil porosity.

Thus, the air passage resistance of the porous upper region 16 is at least 100 N·m$^{-3}$·s greater than the air passage resistance of the porous lower region 20, in particular at least 250 N·m$^{-3}$·s than the air passage resistance of the porous lower region 20.

In absolute value, the air passage resistance of the porous upper region 16 is greater than 250 N·m$^{-3}$·s and is in particular between 250 N·m$^{-3}$·s and 3000 N·m$^{-3}$·s, in particular between 250 N·m$^{-3}$·s and 1500 N·m$^{-3}$·s.

The resistance to air flow or its resistivity is measured using the process described in the thesis "Measurement of parameters characterizing a porous medium. Experimental study of the acoustic behavior of low-frequency foams.", Michel HENRY, defended Oct. 3, 1997 University of Mans.

The thickness ES of the porous upper region 16 is for example between 0.5 mm and 15 mm, and is in particular between 0.5 mm and 10 mm.

This thickness ES is less than 50% of the thickness ET of the body 14. Advantageously, this thickness ES is between 10% and 40% of the thickness ET of the body 14.

The surface density of the porous upper region 16 is greater than 500 g/m$^2$ and is between 500 g/m$^2$ and 3500 g/m$^2$, advantageously between 1000 g/m$^2$ and 2000 g/m$^2$.

The porous upper region 16 advantageously has a flexural stiffness B, brought to a unitary width, greater than 0.01 N·m, in particular between 0.1 N·m and 1 N·m, advantageously between 0.1 N·m and 0.5 N·m.

The stiffness in bend B is computed using the equation:

$$B=E\cdot h^3/12, \text{ where h is the thickness of the porous upper region 16, and E is its Young's modulus.}$$

The Young's Modulus or modulus of elasticity is for example measured using the process described in the article: C. Langlois, R. Panneton, and N. Atalla, "Polynomial relations for quasistatic mechanical characterization of isotropic poroelastic materials," J. Acoust. Soc. Am. 110, 3032-3040 (2001).

The porous lower region 20 has a porosity suitable for having an air flow resistance advantageously between 15,000 N·m$^{-4}$·s and 80,000 N·m$^{-4}$·s, in particular between about 20,000 N·m$^{-4}$·s and 50,000 N·m$^{-4}$·s.

The thickness EI of the porous lower region 20, taken perpendicular to the surface 12, is advantageously between 2 mm and 35 mm, for example between 5 mm and 25 mm.

In order to have spring properties, the porous lower region 20 advantageously has a modulus of elasticity greater than 5000 Pa. This modulus is advantageously comprised between 20,000 Pa and 100,000 Pa, in particular between 30,000 Pa and 40,000 Pa.

The modulus of elasticity is measured as indicated above.

Figure 2:
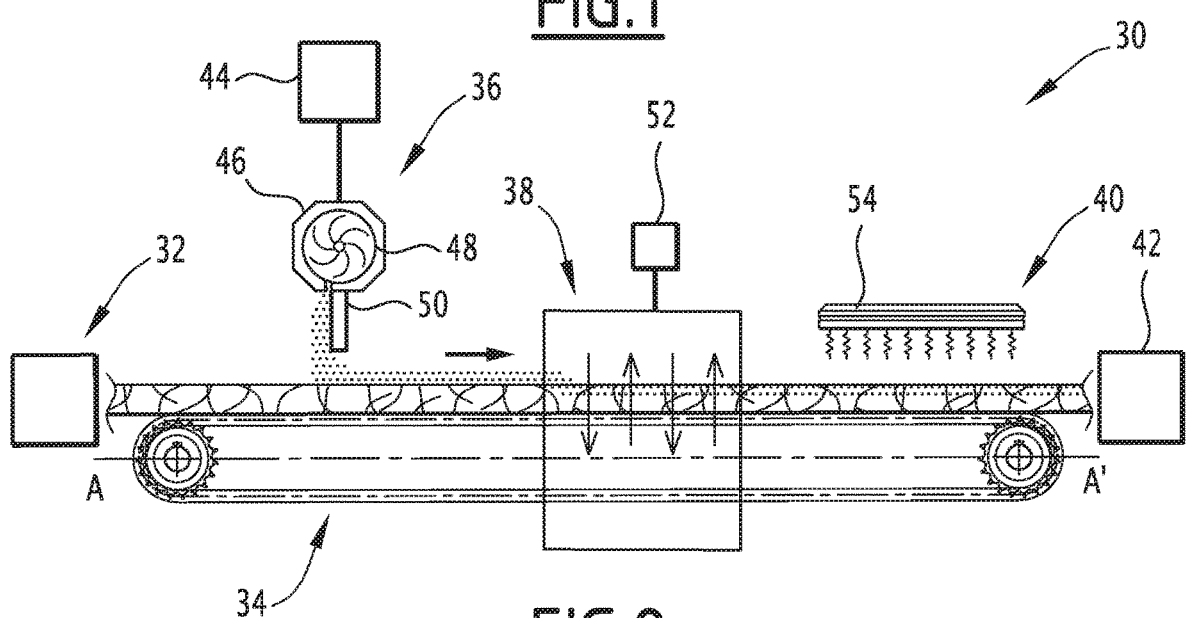
FIG. 2 is a schematic view illustrating part of the process for manufacturing the part of FIG. 1.

A process for manufacturing the soundproofing part 10 according to an embodiment of the invention is carried out in a facility 30 illustrated schematically in FIG. 2.

The facility 30 comprises a unit 32 for supplying a body 14, a conveyor 34 for moving the body 14, at least one unit 36 for depositing granular elements 18 and optionally bonding elements 22 on the body 14, and a unit 38 for incorporating granular elements 18 into the body 14.

The facility 30 further advantageously comprises a unit 40 for activating bonding elements 22 and a cutting unit 42.

The unit 32 for supplying the body 14 is able to form the body 14 from a web of fibers or to supply a preformed body 14 in the form of a strip.

The conveyor 34 is able to cause the body 14 to scroll from the supply unit 32 to reach the cutting unit 42 along a longitudinal axis A-A', so that it passes opposite the depositing unit 36, the incorporating unit 38, the activating unit 40.

The depositing unit 36 comprises a reservoir 44 of granular elements 18 and at least one dispenser 46 able to deposit the granular elements 18 in the form of a continuous layer on the upper surface 26 of the body 14. The dispenser 46 for example comprises a roller 48 and a guide 50 emerging above the upper surface 26.

Alternatively, the granular elements 18 are arranged along specific zones with variable weights so as to locally adapt the air passage resistance and the surface density of the part 10.

The incorporating unit 38 for example comprises a source 52 for generating an electromagnetic field, in particular a variable electric field applied on the granular elements 18 to cause them to penetrate the body 14 over a given thickness.

Advantageously, the incorporating unit 38 further comprises a vibrational source (not shown) to facilitate the incorporation of the granular elements 18 into the body 14.

The incorporating unit 38 is for example formed by a machine of the "FIBROLINE™" type.

The activating unit 40 here comprises a heat source, capable of heating the bonding elements 22 above their melting temperature to cause them to melt at least partially. The heat source for example comprises an infrared lamp.

The cutting unit 42 is able to cut the body 14 comprising the granular elements 18 incorporated into their upper region 16 to the dimensions of the part 10.

A process for manufacturing the part 10 will now be described.

Initially, the body 14 is provided in the form of a strip while being manufactured from a web of fibers directly in the supply unit 32, or in another unit.

The body 14 is brought onto the conveyor 34, in the form of a continuous strip, and is moved successively opposite the depositing unit 36, the incorporating unit 38, and the activating unit 40.

The depositing unit 36 continuously deposits granular elements 18 coming from the reservoir 44 onto the upper surface 26 of the body 14 using the dispenser 46.

Advantageously, the depositing unit 36 jointly or separately deposits bonding elements 22 onto the upper surface 26 of the body 14.

Then, the granular elements 18 deposited onto the body 14 enter the incorporating unit 38. Under the effect of the electromagnetic field created by the source 52, they penetrate the body over a thickness ES corresponding to the thickness of the upper region 16. Likewise, the bonding elements 22 are incorporated into the upper region 16.

Next, the body 14 provided with granular elements 18 and bonding elements 22 enters the activating unit 40. The heating of the bonding elements 22 causes them to melt at least partially, without melting of the granular elements 18.

The granular elements 18 bond to the fibers 15, and partially occupy the interstices between the fibers 15. The local tortuosity therefore increases in the porous upper region 16, and the porosity decreases while remaining non-nil.

The air passage resistance of the porous upper region 16 therefore increases by a value at least 100 N·m$^{-3}$·s greater than the air passage resistance of the lower region 20.

Then, the part 10 is cut to the desired dimensions in the cutting unit 42.

The process therefore makes it possible to obtain a bi-permeable soundproofing part 10, with a chosen air passage resistance for the porous upper region 16, in one step, without having to assemble layers. This process is therefore significantly less expensive than a process of the state of the art comprising the successive manufacture of layers of the part, then their assembly.

Moreover, the process makes it possible to choose the thickness of the porous upper region 16 by the adjustment of the incorporating unit 38 and the scrolling speed on the conveyor 34.

The particle size of the granular elements 18 introduced into the body 14 is also chosen to obtain the desired air passage resistance properties, in combination with the thickness of the porous upper region 16.

The choice of granular elements 18 with a low density, in particular between 0.8 and 2, makes it possible not to significantly increase the mass of the part 10, while obtaining a representative effect on the air passage resistance.

The acoustic properties of the soundproofing part 10 are therefore particularly beneficial, in particular in terms of absorption, and at a lower cost.

In the example shown in FIG. 1, the part 10 is made up of the body 14 comprising the porous upper region 16 and the porous lower region 20. Alternatively (not shown), the soundproofing part 10 further comprises a decorative layer, for example a decoration or a carpet, arranged above the upper surface 26.

In another alternative, granular elements 18 of distinct natures or average sizes are successively or simultaneously introduced into the upper region 16 of the body 14.

Figure 3:
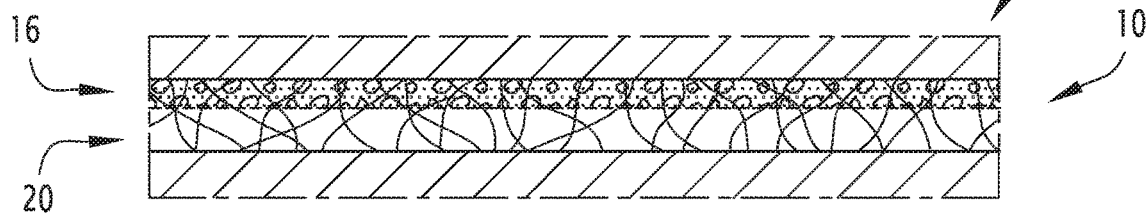
FIG. 3 is a schematic sectional view of an optional additional step of the process for manufacturing the part of FIG. 1.

In another alternative, partially illustrated in FIG. 3, the soundproofing part 10 is introduced into a mold 70 at the outlet of the cutting unit 42.

In this case, the activating unit 40 is not necessarily located upstream from the cutting unit 42, but may be positioned to heat the part 10 before it is introduced into the mold 70 and/or may be incorporated into the mold 70.

Advantageously, the porous upper part 16 and the lower region 20 are compressed in the mold 70 each to have a thickness smaller than that occupied at the outlet of the cutting unit 42.

At the outlet of the mold 70, the porous upper region 16 retains the thickness that it occupies in the mold 70, owing to the presence of the bonding elements 22, while the thickness of the lower region 20 increases to be greater than the thickness that it occupies in the mold 70 and advantageously substantially equal to the thickness that it has at the outlet of the cutting unit 42.

The invention claimed is:

1. An automotive vehicle soundproofing part, comprising:
   a unitary body of interlaced and/or bonded fibers, wherein the unitary body comprises, in its thickness, a porous upper region and a porous lower region; and
   granular elements dispersed between the fibers of the porous upper region,
   wherein no granular elements are dispersed in the porous lower region, or a concentration of dispersed granular elements in the porous lower region is lower than a concentration of dispersed granular elements in the porous upper region;
   the porous upper region having an air passage resistance at least 100 $N \cdot m^{-3} \cdot s$ greater than an air passage resistance of the porous lower region.

2. The part according to claim 1, wherein the air passage resistance of the porous upper region is greater than 250 $N \cdot m^{-3} \cdot s$.

3. The part according to claim 2, wherein the air passage resistance of the porous upper region is comprised between 250 $N \cdot m^{-3} \cdot s$ and 1500 $N \cdot m^{-3} \cdot s$.

4. The part according to claim 1, comprising bonding elements, the granular elements being bonded to the fibers via the bonding elements.

5. The part according to claim 1, wherein the average size of the granular elements is less than 1 mm.

6. The part according to claim 5, wherein the average size of the granular elements is between 5 µm and 500 µm.

7. The part according to claim 1, wherein the density of the material making up the granular elements is less than 3.

8. The part according to claim 7, wherein the density of the material making up the granular elements is between 0.8 and 2.

9. The part according to claim 1, wherein the thickness of the porous upper region is less than 50% of the thickness of the body.

10. The part according to claim 1, wherein the body is a felt or a textile.

11. The part according to claim 1, wherein the porous lower region is located between the porous upper region and a surface of an automotive vehicle when the part is installed over the surface of the automotive vehicle.

12. The part according to claim 1, wherein the granular elements are made from baryte, chalk or clay fillers.

13. A process for manufacturing an automotive vehicle soundproofing part, comprising the following steps:
   providing a unitary body of interlaced and/or bonded fibers;
   incorporating granular elements between the fibers of a porous upper region of the body; and
   maintaining a porous lower region with no dispersed granular elements, or a porous lower region having a concentration of dispersed granular elements lower than the concentration of dispersed granular elements in the porous upper region;
   the porous upper region having an air passage resistance at least 100 $N \cdot m^{-3} \cdot s$ greater than the air passage resistance of the porous lower region.

14. The process according to claim 13, wherein the air passage resistance of the porous upper region is greater than 250 $N \cdot m^{-3} \cdot s$.

15. The process according to claim 14, wherein the air passage resistance of the porous upper region is comprised between 250 $N \cdot m^{-3} \cdot s$ and 1000 $N \cdot m^{-3} \cdot s$.

16. The process according to claim 13, comprising a step for incorporating, between the fibers of the porous upper region of the body, bonding elements, and activating the bonding elements.

17. The process according to claim 16, wherein the step of activating the bonding elements is made by heating to bond the granular elements to the fibers.

18. The process according to claim 13, comprising controlling the penetration thickness of the granular elements during the incorporating step so that the thickness of the porous upper region is less than 50% of the thickness of the fibrous body.

19. The process according to claim 13, wherein the step for incorporating the granular elements comprises incorporating granular elements into the body by applying an electric field and/or by applying a vibrational movement to the body.

* * * * *